Sept. 12, 1950 R. C. BUCHAN 2,522,429
APPARATUS FOR HANDLING OIL FIELD EMULSIONS
Filed April 30, 1948

Inventor:
RUDOLPH C. BUCHAN
By W. O. T. Heilman
Attorney

Patented Sept. 12, 1950

2,522,429

UNITED STATES PATENT OFFICE 2,522,429

APPARATUS FOR HANDLING OIL FIELD EMULSIONS

Rudolph C. Buchan, Houston, Tex., assignor, by mesne assignments, to Standard Oil Development Company, Elizabeth, N. J., a corporation of Delaware Application April 30, 1948, Serial No. 24,176

1 Claim. (Cl. 183—2.7)

The present invention is directed to apparatus for handling oil field emulsions. The invention is more particularly directed to the utilization of an improved apparatus wherein gases are initially separated from the emulsion at a relatively low temperature. The emulsion is thereafter handled to separate free water, then heated and further processed to secure substantially complete segregation of the gas, the water, and the oil.

In the art wherein petroleum oils are recovered from subterranean areas, in practically all cases salt water is produced concurrently with the oil. The mixture in its passage from the subsurface to the surface becomes emulsified and the resulting emulsion must be resolved at the surface into its component parts before the oil can be charged into the pipe lines. Heretofore the customary practice has been to charge the mixture into a separating vessel of any suitable design either with or without preliminary heating in order to resolve the emulsion. In addition, various emulsifying agents have been utilized in order to secure the separation or to speed it up.

One difficulty which has been encountered in separating the oil from the water is that the oil likewise contains gases which likewise must be segregated. The separation of the gas from the emulsion tends to agitate the mixture thus making the segregation of the oil and water in many instances extremely difficult.

The present invention is concerned with an improved apparatus for segregating an oil-water emulsion containing fixed gases and the like. The invention may be readily understood by reference to the drawings illustrating embodiments of the same.

Fig. 1 is a longitudinal view of the apparatus, while

Figure 1:
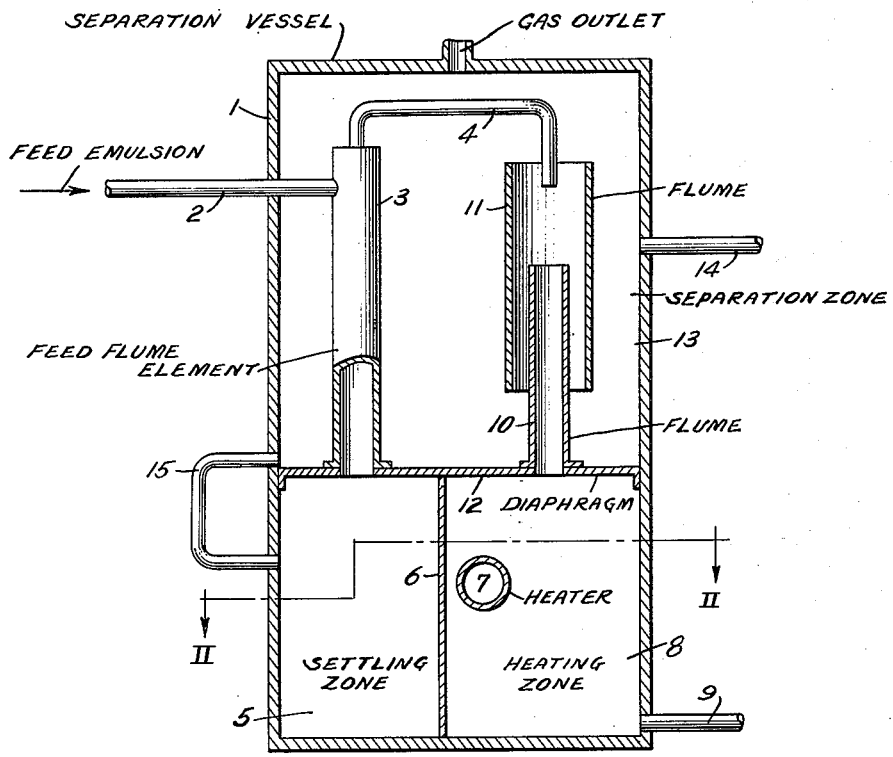

Referring specifically to Fig. 1, a separation vessel or cylindrical drum 1 contains the essential elements. In operation the emulsion is introduced into separation vessel 1 by means of feed line 2. The feed is introduced directly into a feed flume element 3 disposed within separation vessel 1. Flume element 3 is of a tubular structure, the lower end of which is open while the upper end connects with a gas conducting line 4. Gases which separate at the feed temperature flow upwardly in flume element 3 and are conducted by means of gas-conducting line 4 into the top of another flume element hereinafter described.

The liquid emulsion flows downwardly through flume element 3 into a free water settling zone 5. Due to the removal of the gas a certain amount of segregation of the water occurs. This water tends to accumulate on the bottom of settling zone 5. The liquid flows around a baffle element 6 which is welded to the bottom of separation vessel 1 and to one side of the vessel. The upper volume of the liquid which flows around element 6 comes into contact with heater element 7 disposed in heating zone 8. The lower volume of the liquid flowing around element 6 which is substantially free of oil is not heated to any extent since it accumulates in the bottom of heating zone 8 and is withdrawn by means of water withdrawal line 9. Thus an appreciable heat saving is effected.

The heated emulsion collects in the top of heating zone 8 and flows upwardly through flume element 10, the construction of which is tubular. In accordance with the invention, a third cylindrical flume element 11 is concentrically disposed about flume element 10. Flume 11 extends from a point above a diaphragm element 12 to concentrically surround gas conducting line 4. Thus due to the hydrostatic head impressed by the differential between the height of flume element 3 and flume element 10, the heated emulsion flows upwardly through flume 10 around the upper lip of flume 10 and downwardly through the area between flume 10 and flume 11. The mixture flows under the lower lip of flume 11 into separation zone 13. The oil flows upwardly and is removed by means of draw-off line 14 while the separated water collects at the bottom of separation zone 13 and passes through equalizer line 15 into separation zone 5.

Figure 2:
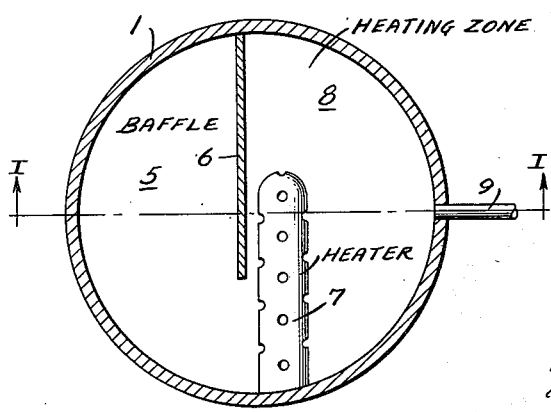
Fig. 2 is a cross-section taken through the line II—II.

Fig. 2 is a cross-sectional view of Fig. 1 through line II—II. Similar numbers have been used to designate similar parts.

The invention is generally directed toward an improved apparatus for treating oil and water emulsions containing gases. In accordance with the invention, fixed gases are removed in an initial cold gas separation zone. These gases which may contain foam in many instances are passed to a zone wherein the gases are reversed in direction about 180° and the foam, if it exists, is impacted upon a heated oil-water liquid. This tends to throw out the foam and thus cause its separation.

The emulsion from which some fixed gases have been removed is passed downwardly into a settling zone wherein water tends to settle out. The entire mixture is then passed over a heating element so disposed that little heating of the relatively oil-free water results. The heated emulsion then passes upwardly through a flume into a separation zone wherein separation of the oil and water is secured. The water is withdrawn from the separation zone through a hydrostatic equalizer which equalizes the hydrostatic head above and below a diaphragm element. The water is passed to the settling zone from which it is withdrawn from the system as it accumulates. Furthermore, by the use of the equalizer the heat present in the water is utilized thus effecting considerable heat economy. In operation it is very desirable to maintain an interface between oil and water in the separation zone at a point above the diaphragm.

The heating zone is so regulated so as to control the temperature of the upflowing liquid preferably at a temperature in the range from 100° F. to 150° F.

Having described my invention, it is claimed:

An improved apparatus adapted to resolve oil emulsions containing gases which comprises a vertically disposed cylindrical vessel, said vessel being divided into an upper separation zone and into a lower zone by means of a horizontal diaphragm, said lower zone being separated into a settling zone and a heating zone by a vertically disposed baffle, said baffle being characterized by extending from one wall beyond the midpoint of said lower zone into spaced relation to the opposite wall, a heating element disposed in the upper area of said heating zone, and initial tubular member extending upwardly from said settling zone, feed means connecting with the upper end of said initial tubular member, a second tubular member extending upwardly from said heating zone to a point below the height of said initial tubular member, a third tubular member disposed in said separation zone in space relation between the top and bottom of said separation zone and concentrically disposed about said second tubular member, means for permitting the flow of liquid from said separation zone around said diaphragm into said settling zone, means for withdrawing fluid from the bottom of said heating zone, means for withdrawing fluid from an intermediate point in said separation zone and means for permitting the withdrawal of gas from the top of said separation zone and means for permitting the flow of vapors from the top of said initial tubular member into said third tubular member.

RUDOLPH C. BUCHAN.

REFERENCES CITED

The following references are of record in the file of this patent:

UNITED STATES PATENTS

| Number    | Name          | Date           |
|-----------|---------------|----------------|
| 1,367,783 | Krumwiede     | Feb. 8, 1921   |
| 1,964,836 | Wheaton       | July 3, 1934   |
| 2,003,140 | Dehn          | May 28, 1935   |
| 2,342,950 | Lovelady et al. | Feb. 29, 1944 |
| 2,420,115 | Walker et al. | May 6, 1947    |
| 2,431,009 | Young         | Nov. 18, 1947  |